F. Krandelt,
Egg Beater.
No. 100,155. Patented Feb. 22. 1870.
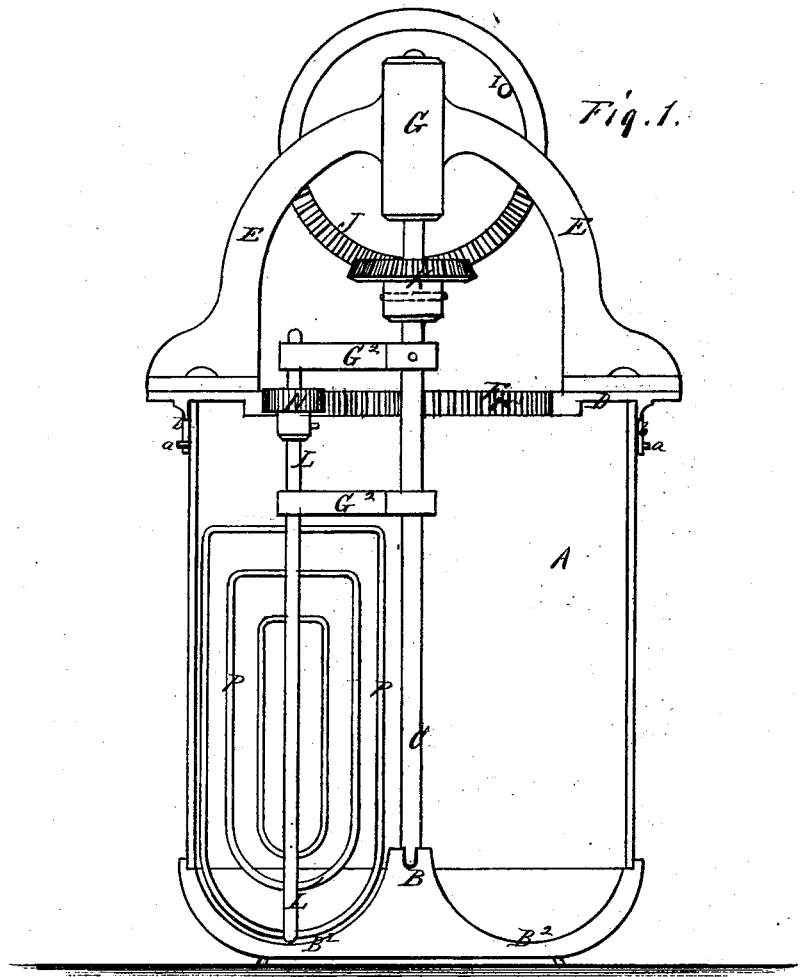
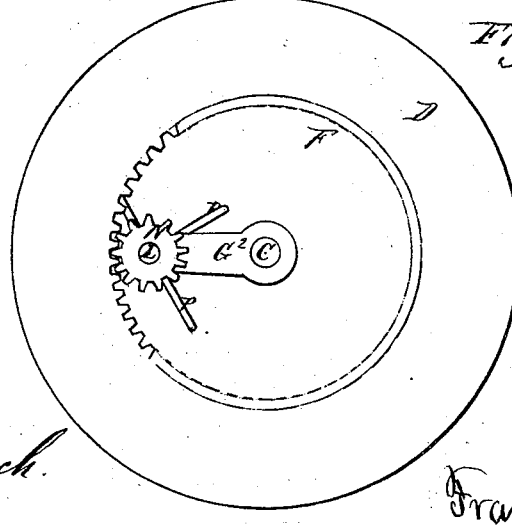
Witnesses,
Eugene Folger
Wm. Gerlach.
Inventor,
Frank Krandelt

United States Patent Office.

FRANK KRANDELT, OF SAN FRANCISCO, CALIFORNIA.

Letters Patent No. 100,155, dated February 22, 1870.

IMPROVED EGG-BEATER.

The Schedule referred to in these Letters Patent and making part of the same

*To all whom it may concern:*

Be it known that I, FRANK KRANDELT, of the city and county of San Francisco, State of California, have invented an Improved Egg-Beater; and I do hereby declare the following description and accompanying drawings are sufficient to enable any person skilled in the art or science to which it most nearly appertains to make and use my said invention or improvements without further invention or experiment.

My invention relates to an improved containing-vessel and device for beating and preparing eggs for use in confectioneries and restaurants where it is desired to beat a quantity at once. It can also be used for beating a small quantity, if desired; and it consists of a vessel of a peculiar construction, inside of which the eggs are placed.

A beater is arranged to be revolved inside of the vessel by means of gears, and also traverses around in a circle, so as to thoroughly beat the eggs in a short time.

In order to more fully illustrate and explain my invention, reference is had to the accompanying drawings forming a part of this specification, in which—

A represents a metal vessel, having its bottom inside rounded, so as to present no corners or angles in which the eggs can stand to escape the action of the beater. In the center of this circular bottom is a conical projection, B, which serves as a step to receive the lower end of the vertical shaft C. The cover D of this vessel is removable, being provided with catches $b$ upon each side, which lock over small pins $a$ on the side of the vessel. The central portion F of this cover is cut away, forming a circular opening in its top, and the inside edge is toothed, forming an inside gear.

A yoke, E, is secured to the cover upon each side, having at its highest part, and directly over the center of the opening F, a vertical cylinder, G, secured to it.

The shaft C steps in the conical projection B at the bottom of the vessel, its upper end passing through the cylinder G.

Attached to the side of the cylinder G, and operated by a crank, I, is a bevel-wheel, J, which engages with the beveled pinion K on the vertical shaft C.

Arms $G^2$ are secured to the upright shaft C a short distance apart, and a vertical shaft, L, passes through holes in their ends, and bears upon the circular bottom, where, if desired, a small track can be made for it to run in. Secured to this shaft L between the two arms $G^2$ is a pinion, N, which engages with the inside gear of the cover, thus causing the beater P, which is on the lower end of this shaft, to revolve with great speed as the arms on the shaft C carries the shaft L around the circle.

The beater P can be made in any of the usual styles.

This device will be useful to confectioners and bakers for various other purposes, such as beating the various compositions for cakes.

When it is desired to introduce the eggs or other composition, the cover is removed, and replaced when ready to commence beating.

Any number of eggs can be beat without danger of spilling or jostling it out, as is common in the old way of beating them.

Having thus described my invention,

What I claim and desire to secure by Letters Patent, is—

1. The vessel A with its curved bottom $B^2$ and conical projection B, substantially as and for the purpose herein described.

2. The cover D with inside gear, in combination with the shaft L, pinion N, and beater P, substantially as and for the purpose described.

3. The arms $G^2$ secured to the shaft C and carrying the shaft L, the whole being operated by the beveled wheel J and beveled pinion K, substantially in the manner and for the purpose above described.

In witness whereof I have hereunto set my hand and seal.

FRANK KRANDELT. [L. S.]

Witnesses:
EUGENE FOLGER,
WM. GERLACH.